(12) United States Patent
Wang et al.

(10) Patent No.: US 12,340,822 B2
(45) Date of Patent: Jun. 24, 2025

(54) AUDIO CONTENT IDENTIFICATION

(71) Applicant: Dolby Laboratories Licensing Corporation, San Francisco, CA (US)

(72) Inventors: Guiping Wang, Beijing (CN); Lie Lu, Dublin, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 243 days.

(21) Appl. No.: 18/022,125

(22) PCT Filed: Aug. 18, 2021

(86) PCT No.: PCT/US2021/046454
§ 371 (c)(1),
(2) Date: Feb. 17, 2023

(87) PCT Pub. No.: WO2022/040282
PCT Pub. Date: Feb. 24, 2022

(65) Prior Publication Data
US 2024/0038258 A1    Feb. 1, 2024

Related U.S. Application Data

(60) Provisional application No. 63/074,621, filed on Sep. 4, 2020.

(30) Foreign Application Priority Data

Aug. 18, 2020   (WO) ................. PCT/CN2020/109744
Oct. 6, 2020    (EP) ...................................... 20200318

(51) Int. Cl.
*G10L 25/81* (2013.01)
*G10L 15/02* (2006.01)
*G10L 15/08* (2006.01)

(52) U.S. Cl.
CPC .............. *G10L 25/81* (2013.01); *G10L 15/02* (2013.01); *G10L 15/08* (2013.01)

(58) Field of Classification Search
CPC .................................... G10L 25/81; G06F 3/16
See application file for complete search history.

(56) References Cited

U.S. PATENT DOCUMENTS 5,616,876 A * 4/1997 Cluts ...................... G06F 16/634
                                                   348/E7.071
7,263,485 B2   8/2007 Wark
(Continued)

FOREIGN PATENT DOCUMENTS

CN   103186527 A   4/2017
CN   111177454 A   5/2023
(Continued)

OTHER PUBLICATIONS

Sanden, Chris, and John Z. Zhang. "Enhancing multi-label music genre classification through ensemble techniques." Proceedings of the 34th international ACM SIGIR conference on Research and development in Information Retrieval. 2011. (Year: 2011).*
(Continued)

*Primary Examiner* — Shaun Roberts

(57) ABSTRACT

A method of audio content identification includes using a two-stage classifier. The first stage includes previously-existing classifiers and the second stage includes a new classifier. The outputs of the first and second stages calculated over different time periods are combined to generate a steering signal. The final classification results from a combination of the steering signal and the outputs of the first and second stages. In this manner, a new classifier may be added without disrupting existing classifiers.

20 Claims, 3 Drawing Sheets

(56) References Cited

U.S. PATENT DOCUMENTS

| | | |
|---|---|---|
| 7,953,693 B2 | 5/2011 | Smith |
| 8,400,566 B2 | 3/2013 | Terry |
| 9,020,816 B2 | 4/2015 | McClain |
| 9,842,605 B2 | 12/2017 | Lu |
| 10,129,314 B2 | 11/2018 | Ehmann |
| 10,411,669 B2 | 9/2019 | Wang |
| 10,424,321 B1 | 9/2019 | Sharifi |
| 10,522,186 B2 | 12/2019 | Attorre |
| 10,556,087 B2 | 2/2020 | McCarthy |
| 11,282,509 B1* | 3/2022 | Li .................... G06F 16/65 |
| 2003/0101050 A1* | 5/2003 | Khalil ................ G10L 19/22 704/E19.041 |
| 2008/0075303 A1* | 3/2008 | Kim .................. G10H 1/125 381/103 |
| 2008/0133441 A1* | 6/2008 | West .................. G06N 20/00 706/46 |
| 2011/0029108 A1 | 2/2011 | Lee |
| 2013/0058488 A1* | 3/2013 | Cheng ................ G10L 25/81 381/56 |
| 2014/0180674 A1* | 6/2014 | Neuhauser ........... G10L 25/81 704/9 |
| 2015/0332667 A1* | 11/2015 | Mason ................ G10L 15/02 704/249 |
| 2015/0347388 A1* | 12/2015 | Lu .................... G06F 9/454 704/9 |
| 2016/0049915 A1* | 2/2016 | Wang ................ G10L 21/0364 381/107 |
| 2016/0078879 A1* | 3/2016 | Lu .................... G10L 21/02 381/56 |
| 2016/0155456 A1* | 6/2016 | Wang ................ G10L 19/12 704/208 |
| 2017/0011754 A1* | 1/2017 | Choo .................. G10L 25/81 |
| 2017/0076725 A1* | 3/2017 | Kumar ................ G10L 15/10 |
| 2017/0359659 A1* | 12/2017 | Von Brasch ......... H04R 25/505 |
| 2018/0144746 A1* | 5/2018 | Mishra ............... G06V 40/172 |
| 2018/0181880 A1 | 6/2018 | Wang |
| 2019/0028766 A1* | 1/2019 | Wold ................ G06Q 50/184 |
| 2020/0020328 A1* | 1/2020 | Gordon ............... G10L 15/08 |
| 2020/0075019 A1 | 3/2020 | Steelberg |
| 2020/0134083 A1 | 4/2020 | Elliman |

FOREIGN PATENT DOCUMENTS

| | | |
|---|---|---|
| EP | 3109861 A1 | 12/2018 |
| JP | 2016519493 A | 6/2016 |
| JP | 2016519784 A | 7/2016 |
| JP | 2016523006 A | 8/2016 |
| WO | 2014160548 A1 | 10/2014 |
| WO | 2020123424 A1 | 6/2020 |

OTHER PUBLICATIONS

Li Zhitong et al: 11 "Optimization of EVS 1-14 Speech/Music Classifier based on Deep Learning" 2018 14th IEEE International Conference on Signal Processing (ICSP), IEEE, Aug. 12, 2018 (Aug. 12, 2018), pp. 260-264, 5 pages.

Malenovsky Vladimir et al: 11 Two-stage speech/music classifier with decision smoothing and sharpening in the EVS codec 11 2015 IEEE International Conference on Acoustics, Speech and Signal Processing (ICASSP). IEEE, Apr. 19, 2015 (Apr. 19, 2015), pp. 5718-5722, 5 Pages.

Su, Ja-Hwung, et al "Music Recommendation Using Content and Context Information Mining" Mobile Informtion Retrieval IEEE Intelligent Systems, vol. 25, No. 1, pp. 16-26, Jan.-Feb. 2010.

Wu Chou et al: "Robust singing detection 1-14 in speech/music discriminator design", 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY IEEE, US, vol. 2, May 7, 2001 (May 7, 2001), pp. 865-868, 8 Pages.

\* cited by examiner

AUDIO CONTENT IDENTIFICATION

CROSS-REFERENCE TO RELATED APPLICATIONS

This application is a National Phase entry of PCT Application No. PCT/US2021/046454, having an international filing date of Aug. 18, 2021, which claims priority of the following priority applications: PCT/CN international application PCT/CN2020/109744, filed 18 Aug. 2020, U.S. provisional application 63/074,621 filed 4 Sep. 2020, and EP Application Serial No. 20200318.2 filed 6 Oct. 2020, each of which is incorporated by reference herein in its entirety.

FIELD

The present disclosure relates to audio processing, and in particular, to audio content identification.

BACKGROUND

Unless otherwise indicated herein, the approaches described in this section are not prior art to the claims in this application and are not admitted to be prior art by inclusion in this section.

Audio playback has become popular with the rise of consumer entertainment devices, e.g., smart phones, tablets, PCs etc. There are also tens of thousands of audio application scenarios, such as high-fidelity playback, streaming, gaming, podcast, short video and live broadcast of users, etc. Thus, in order to improve the overall quality of the audio and provide different user experiences, there are different audio processing algorithms to enhance audio signals for various purposes. Some typical examples of audio processing algorithms include dialogue enhancement and intelligent equalization.

Dialogue enhancement generally enhances speech signals. Dialogue is an important component in a movie to understand the story. Dialogue enhancement implements methods to enhance the dialogue in order to increase their clarity and their intelligibility, especially for elders with decreased hearing capability.

Intelligent equalization generally performs dynamic adjustment of the audio tone. Intelligent equalization is often applied in a music content in order to provide consistency of spectral balance, as known as "tone" or "timbre". It achieves this consistency by continuously monitoring the spectral balance of the audio, comparing it to a desired tone, and dynamically adjusting an equalization filter to transform the audio's original tone into the desired tone.

In general, an audio processing algorithm has its own application scenario/context. That is, an audio processing algorithm may be suitable for only a certain set of content but not for all the possible audio signals, since different content may need to be processed in different ways. For example, a dialogue enhancement method is usually applied on movie content. If it is applied on music in which there is no dialogue, it may falsely boost some frequency sub-bands and introduce heavy timbre change and perceptual inconsistency. Similarly, if an intelligent equalization method is applied on movie contents, timbre artifacts will be audible. However, for an audio processing system, its input could be any of the possible types of audio signals. Thus, identifying or differentiating the content being processed becomes important, in order to apply the most appropriate algorithms (or the most appropriate parameters of each algorithm) on the corresponding content.

A general content-adaptive audio processing system includes three functions: audio content identification, steering, and audio processing.

Audio content identification automatically identifies the audio types of the content on playback. Audio classification technologies, through signal processing, machine learning, and pattern recognition, can be applied to identify audio content. Confidence scores, which represent the probabilities of the audio content regarding a set of pre-defined target audio types, are estimated.

Steering generally steers the behavior of audio processing algorithms. It estimates the most suitable parameters of the corresponding audio processing algorithm based on the results obtained from audio content identification.

Audio processing generally applies audio processing using the estimated parameters to an input audio signal to generate an output audio signal.

SUMMARY

As the ever-changing audio contents and new applications increase, especially for user-generated content and the corresponding applications (e.g., chatting, streaming, live broadcast, short video, etc.), it is an inevitable consequence of improving the audio identifiers (classifiers) and the steering algorithms in existing systems to meet the performance requirement on new contents or new use cases. Taking music for example, pop music including jazz, country, rock and latin music used to be mainstream across over different applications. Thus, the general music classifier in many existing systems is mainly targeted for identifying the above music genres and generated confidence scores precisely for subsequent steering algorithms and audio processing algorithms With the changes of the trend of fashions, many people prefer to listen to different music genres, such as rap/hip-hop, electronic music or the combinations between different music styles. In particular, rap music mainly consists of (rhythmic-) talking, which is hard to distinguish from common dialogue speaking. In many existing cases, the original music classifier is usually not capable of providing enough accuracy on the rap music or a cappella music classification. As a result, some segments/frames of rap music would be falsely identified as speech and then boosted by the dialogue enhancer, triggering audible artifacts.

Moreover, with the increasing needs from customers, the audio processing system may need to provide new functionalities, which further requires the audio classifier identify certain audio content types. Both of the above scenarios need a new classifier. While the new audio classifier provides more classification results, it is also hoped that the classification results on originally supported content types (such as dialogue or music) could be still similar to those from the old classifier so that other audio processing algorithms, such as dialogue enhancement and intelligent equalization, do not need to be heavily tuned after the new classifier is used.

Given the above, there is a need to add a new classifier to an existing classification system while still keeping the original audio processing behavior close to the original. Whatever improving the original classifiers on specific new contents or adding new functionalities, it is usually not trivial to transparently update or replace the old classifier with the new classifier. The whole system may not straight-forwardly work optimally after the identifier replacement. In many cases, after an identifier is updated, the subsequent steering algorithms and audio processing algorithms may also need corresponding refinement or tuning; moreover, what the user expects to keep in the original music identifier for the behaviors testing on previous contents may be not suitable anymore. This may introduce a large amount of extra efforts on retuning in order to fully integrate the new component, which is undesirable.

In this disclosure, we propose a method of improving the original content identification on new contents while minimizing the extra efforts on developing or verification. Described herein are techniques related to using a two-stage audio classifier.

According to an embodiment, a method of audio processing includes receiving an audio signal and performing feature extraction on the audio signal to extract a plurality of features. The method further includes classifying the plurality of features according to a first audio classification model to generate a first set of confidence scores, and classifying the plurality of features according to a second audio classification model to generate a second confidence score. The method further includes calculating a steering signal by combining a first confidence score of the first set of confidence scores and a further confidence score of the first set of confidence score. The method further includes calculating a final confidence score according to the steering signal, the first set of confidence scores, and the second confidence score. The method further includes outputting a classification of the audio signal according to the final confidence score.

According to another embodiment, an apparatus includes a processor and a memory. The processor is configured to control the apparatus to implement one or more of the methods described herein. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

DETAILED DESCRIPTION

Described herein are techniques related to audio content identification. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document describes various processing functions that are associated with structures such as blocks, elements, components, circuits, etc. In general, these structures may be implemented by a processor that is controlled by one or more computer programs.

Figure 1:
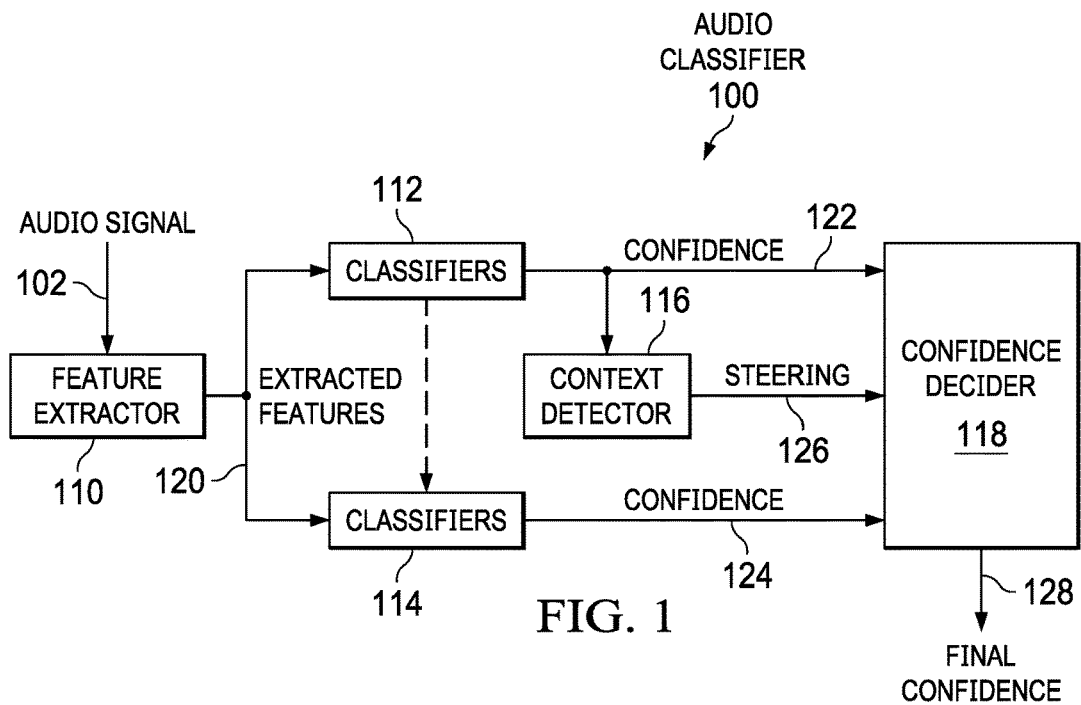
FIG. 1 is a block diagram of an audio classifier 100.

FIG. 1 is a block diagram of an audio classifier 100. The audio classifier 100 generally receives an input audio signal 102, performs classification of the input audio signal 102 using various models, and outputs a confidence score 128. The audio classifier 100 includes a feature extractor 110, a first set of classifiers 112 (also referred to as the original classifiers), a second set of classifiers 114 (also referred to as the new classifiers), a context detector 116, and a confidence decider 118. The audio classifier 100 may also be generally referred to as a two-stage audio classifier or a two-stage music classifier. Alternatively, the classifiers 112 and 114, the context detector 116 and the confidence decider 118 (e.g., excluding the feature extractor 110) may collectively be referred to as a two-stage audio classifier or a two-stage music classifier.

The feature extractor 110 receives the audio signal 102, performs feature extraction on the audio signal 102, and generates extracted features 120. The particular features extracted generally are selected according to the particular features that are relevant to the models implemented by the classifiers 112 and 114. As an example, the extracted features 120 may correspond to the spectral energy in various frequency bands of the audio signal 102.

The classifiers 112 generally comprise one stage of the audio classifier 100. The classifiers 112 receive the extracted features 120, perform classification of the extracted features 120 using one or more models, and generate a set of confidence scores 122 (also referred to as the original confidence score). The set of confidence scores 122 may include one or more confidence scores, e.g. corresponding to the one or more models.

The classifiers 112 generally correspond to an existing set of classifiers. In general, the existing set of classifiers have been developed to classify existing genres of audio, but may be less able to accurately classify new genres of audio. The classifiers 112 may include one or more classifiers, including a speech classifier, a music classifier, a sound effect classifier, a noise classifier, etc. The classifiers 112 may include one or more different types of each classifier, for example two or more types of music classifiers, each developed to classify a specific genre of music (e.g., a jazz classifier, a rock classifier, etc.). The speech classifier generally assesses whether the audio signal 102 corresponds to speech (e.g., dialogue) as opposed to music, sound effects, etc. The sound effect classifier generally assesses whether the audio signal 102 corresponds to sound effects (e.g., movie sound effects such as car crashes, explosions, etc.) as opposed to speech (e.g., dialogue) or music (e.g., background music, mood music, etc.). The noise classifier generally assesses whether the audio signal 102 contains noise (e.g., a constant or repetitive sound such as a hum, buzz, whine, jackhammer, siren, waterfall, rainfall, etc.).

The classifiers 112 may be implemented by a machine learning system that uses various models of the various types of audio to perform the various classifications. The classifiers 112 may implement an adaptive boosting (AdaBoost) or a deep neural network machine learning process. The AdaBoost process may be implemented in devices that use a small model size or have limited capability to perform complex computations. The deep neural network process may be implemented in devices that allow a greater model size and have greater ability to execute complex computations. In general, the models of the classifiers 112 are developed offline by performing machine learning on a set of training data.

The classifiers 114 generally comprise a second stage of the audio classifier 100. The classifiers 114 receive the extracted features 120, perform classification of the extracted features 120 using one or more models, and generate a set of confidence scores 124 (also referred to as the new confidence score). The confidence score 124 may include one or more confidence scores, e.g. corresponding to the one or more models.

The classifiers 114 generally correspond to a new set of classifiers. In general, the new classifiers have been developed to classify new genres of audio. For example, the training data used to develop the models for the original classifiers 112 may not have included audio data for new genres of music, making the original classifiers 112 not perform well in identifying the new genres. As described in more detail below, the new classifiers 114 include a rap classifier.

The classifiers 114 may be implemented by a machine learning system that uses various models of the various types of audio to perform the various classifications. The classifiers 114 may implement an adaptive boosting (AdaBoost) or a deep neural network machine learning process. In general, the models of the classifiers 114 are developed offline by performing machine learning on a set of training data.

The classifiers 114 may also receive information from the classifiers 112, such as the set of confidence scores 122. For example, the classifiers 114 may receive an indication from the classifiers 112 that the audio signal 102 corresponds to speech or music (as opposed to sound effects or noise).

The context detector 116 receives the set of confidence scores 122 and generates a steering signal 126. The context detector 116 may receive information from the classifiers 112 that indicates that the audio signal 102 contains neither speech nor music. In general, the context detector 116 evaluates the components of the set of confidence scores 122 over various time frames, and uses the smoothed confidence scores to reduce the impact of misclassifications over the short term. The context detector 116 generates the steering signal 126 to weight the impact of the sets of confidence scores 122 and 124 by subsequent components. Further details of the context detector 116 and the steering signal 126 are provided below.

The confidence decider 118 receives the sets of confidence scores 122 and 124 and the steering signal 126, and generates a final confidence score 128. In general, the confidence detector 118 smoothly transitions the audio classifier 100 from using only the classifiers 112 to also using the classifiers 114, when appropriate according to the confidence score 124. Further details of the confidence decider 118 are provided below.

Rap Music Classification

The following sections discuss a specific use case of rap music classification for the classifiers 114. As compared to existing music genres, rap music has similarities to both dialogue and music. Using existing classifiers thus risks classifying rap music as either dialogue and applying one set of audio processing algorithms, or music and applying another set of audio processing algorithms, neither of which may be appropriate for rap music. In addition, existing classifiers may rapidly switch between the classifications of dialogue and music, resulting in rapidly switching between the two processing algorithms, resulting in an inconsistent listening experience. Adding a rap classifier, and integrating the rap classifier with existing classifiers to form a two-stage classifier, results in an improved listening experience without disrupting the existing classifiers.

Subband-Based Spectral Energy

For rap music, the new features extracted by the feature extractor 110 are developed based on spectral energy, which shows the energy fluctuation characteristics of different contents in frequency domain. First, the input audio signal is transformed to spectral coefficients by time frequency conversion tool (e.g., quadrature mirror filter (QMF), fast Fourier transform (FFT), etc.), then the energy spectrum is calculated by above spectral coefficients, here the whole energy spectrum is further divided into four sub-bands in this disclosure.

The first sub-band energy, representing the energy distribution of low frequency below 300 Hz, is used to detect the onset of bass or drums. The second sub-band energy, representing the energy distribution between 300 Hz and 1 kHz, is used to measure the fluctuation of vocal pitch. The third sub-band energy, representing the energy distribution between 1 kHz and 3 kHz, is used to measure the fluctuation of vocal harmonic. The fourth sub-band energy, representing the energy distribution between 3 kHz and 6 kHz, is used to detect the fluctuation of unvoiced signal or snare drum.

All the sub-band spectral energies are calculated in short-term frames, e.g. 20 ms, and then stored in a memory buffer until it meets the expected window length, e.g. 5 s. Finally the high-level features could be derived based on above window-length spectral energy.

The number of sub-bands, the frequency range of each sub-band, the frame length, and the window length may be adjusted as desired. For example, to classify a different new genre, the sub-bands appropriate for that new genre may be used to generate a model for another new classifier 114.

Characteristics of Rap Music

Compared to general music, the typical rap music has a few prominent differences, including the vocal tempo, the rhythmic lyrics, the regularity of musical bars, etc. Based on the above sub-band spectral energy, we introduce the peak/valley tracking method to find the cues to reflect the characteristics of vocal tempo, the rhythmic meter and the regularity of musical bars.

For a typical rap music, the general tempo is around 100 to 150 beats per minute (BPM), and typically with 4/4-time signature; the lyrics are often sung regularly over a fixed period so that the number of syllables in each sentence is almost similar. Thus, some new features are deduced accordingly:

A first feature is the statistical characteristics of sub-band spectral energy distribution. Over a fixed period, the spectral energy parameters are divided into several musical bars; in each bar, the peak/valley spectral energy may be calculated and the number of peak/valley are also counted. The features indicating the statistical characteristics of the above spectral energy (e.g., mean, standard deviation, etc.) may be used for distinguishing rap music from general speech content.

A second feature is the peak/valley location intervals of sub-band spectral energy. The vocals or syllables consist of voiced sound and unvoiced sound, to some extent which are related to the peak and valley of spectral energy so that the locations of peak/valley are at regular intervals for general rap music. However, for natural dialogue speaking, there is not obvious and regular intervals between voiced and unvoiced sound. Therefore, here the locations of peak/valley, represented by the index in the window-length spectral energy, is recorded in a continuous manner and then each interval of adjacent peak locations is calculated. Finally, the even distributions of these intervals are used as the key features of rap music.

A third feature is the contrast of peak and valley spectral energy. Compared to general speech or dialogue in movies or shows, the contrast of peak vocal energy and valley vocal energy in rap music is not much different, which also may be used as an important cue to indicate if the audio content is dialogue content or not.

A fourth feature is the rhyme features. Most of the lyrics of rap music are written in certain meters and rhyme schemes. Unfortunately, it may be computationally infeasible to segment the lyrics correctly based on syllable unit without semantic recognition. In addition, sometimes the rhyme is incomplete in rap music, especially when lacking one or more syllables in the final metrical foot.

A fifth feature is the rhythmic features. Rhythmic features, representing the frequency and strength of musical onset and the rhythmic regularity and contrast, are calculated on the sub-band energy of various spectral range mentioned above. One measurement may be based on the 1st/4th sub-band, and the other may be based on the 2nd/3rd sub-band spectral energy, respectively.

Selection of Data and Features for Training the Two-Stage Music Classifier

Before training the rap classifier, it is necessary to prepare a set of training data and finalize the features and classifier algorithms The training database consists of various content types such as speech, rap music, non-rap music, sound effects, noise, etc., which are collected from various applications and hand-labelled to represent their corresponding audio types over time. These labels represent the ground truth of the audio content. In order to meet the requirements of different application scenarios, the feature set may be selected jointly or separately between old features and new features. In a similar way, the new model may also be trained independently or jointly with multiple models by using different learning algorithms There are different combinations of old features/training data and new features/training data, depending on the requirement of the new classifier and the system tolerance. Unfortunately, it is hard to find the optimal solution of the above combinations since we cannot enumerate all the selection possibilities. In practice, we manually split the training data set into two data chucks, one data chuck representing rap music content genre and the other data chuck representing non-rap. For feature set, we select both the original and new features for training rap music classifier, meanwhile remaining the old features for the old music classifier. Therefore, there are two independent music classifiers: One is the original music classifier as the first-staged music classifier for general music content identification (e.g., the set of classifiers 112) and the other is the new-trained rap music classifier as the second-staged music classifier (e.g., the set of classifiers 114), which is specifically for identifying the audio content between rap songs and dialogue contents.

Arrangement of Classifiers into Two Stages

Figure 2:
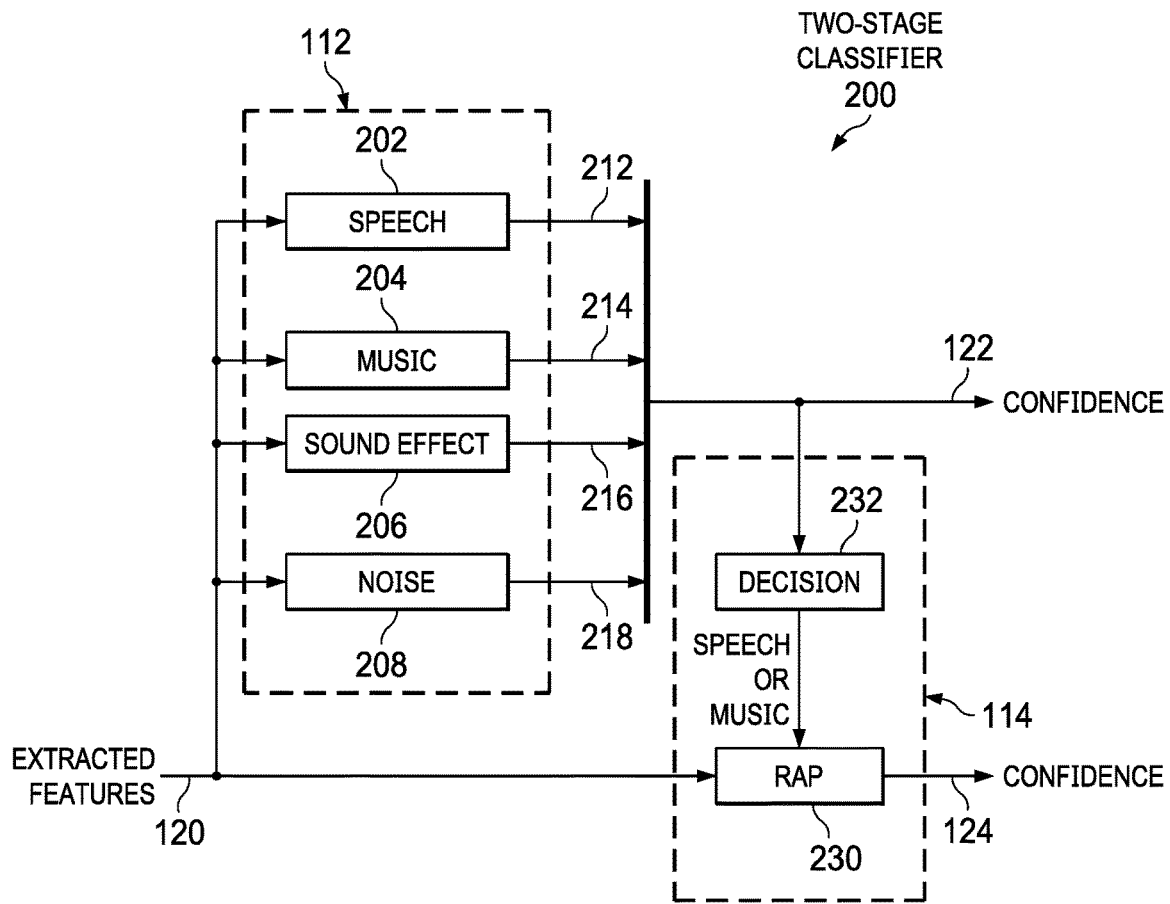
FIG. 2 is a block diagram showing an arrangement of classifiers into a two-stage classifier 200.

FIG. 2 is a block diagram showing an arrangement of the classifiers 112 and 114 (see FIG. 1) into a two-stage classifier 200. The classifiers 112 form a first stage, and include a speech classifier 202, a music classifier 204, a sound effect classifier 206, and a noise classifier 208. The classifiers 112 receive the extracted features 120 and respectively generate a speech confidence score 212, a music confidence score 214, a sound effect confidence score 216, and a noise confidence score 218, which collectively comprise the set of confidence scores 122.

The classifiers 114 form a second stage and include a rap classifier 230. The second stage also includes a decision stage 232. The decision stage 232 receives the set of confidence scores 122. When the set of confidence scores 122 indicates that the audio signal 102 does not correspond to speech or music (e.g., low values for the speech confidence score 212 and the music confidence score 214, or a high value for the sound effect confidence score 216 or the noise confidence score 218), the two-stage classifier 200 outputs the set of confidence scores 122. When the set of confidence scores 122 indicates that the audio signal 102 does correspond to speech or music (e.g., a high value for the speech confidence score 212 or the music confidence score 214), the decision stage indicates this information to the rap classifier 230.

The rap classifier 230 receives the extracted features 120 and the indication of speech or music from the decision stage 232. To effectively reduce the computational complexity, it is not necessary to run the rap classifier 230 all the time for all the contents. Instead, the classifiers 112 and the classifiers 114 are arranged as a two-stage cascaded classifier. Firstly, the confidence scores for each audio type are calculated in the first stage, which determines the corresponding audio type with the maximal confidence score. If the audio type is speech or music type, then the condition is met and the indication is provided to the rap classifier 230 to perform further identification. The two-stage classifier 200 then outputs the confidence score 124 resulting from the operation of the rap classifier 230. If the output type of first-stage classifiers is sound effect or noise, the rap classifier 230 may be bypassed.

Context Detector 116

The context detector 116 (see FIG. 1) generally monitors the changes in the confidence values over time. Both the original classifiers (e.g., the classifier 112) and new classifiers (e.g., the classifier 114) may make mistakes in a short period. Thus, the context detector 116 assesses the continuous context information in a longer term. For example, listening to music over a period of several minutes results in the context information tending to have high confidence score of the music type at the end of this period, which could help correct sudden false alarm by misclassification over a short time period. The context detector 116 takes both long-term context and short-term context into consideration. The long-term context information is the music confidence score (e.g., the music confidence score 214) that is slowly smoothed. For example, the slow smoothing may be determined over 8 to 12 seconds, e.g., 10 seconds. The long-term context information $\bar{p}(t)$ may then be calculated according to Equation (1):

$$\bar{p}(t)=\alpha_{context}p(t)+(1-\alpha_{context})\bar{p}(t-1)$$

where p(t) is the confidence score of the music classifier (e.g., the music confidence score 214) at the current frame t of the audio signal 102, and a context is the long-term smoothing coefficient.

In a similar way, the short-term context information is the non-music confidence score (e.g., the greater of the sound effect confidence score 216 and the noise confidence score 218) that is quickly smoothed. For example, the quick smoothing may be determined over 4 to 6 seconds, e.g., 5 seconds. The short-term context information $\bar{q}(t)$ may then be calculated according to Equation (2):

$$\bar{q}(t)=\beta_{context}g(t)+(1-\beta_{context})\bar{q}(t-1)$$

where q(t) is the maximum of the sound effect confidence score 216 and the noise confidence score 218 at the current frame t of the audio signal 102, and $\beta_{context}$ is the short-term smoothing coefficient.

Given the above context signals $\bar{p}(t)$ and $\bar{q}(t)$, a steering signal s(t) can be determined by a non-linear function h( ). For example, a sigmoid function may be used to map the obtained context signal to the expected steering signal (from 0 to 1), according to Equation (3):

$$s(t)=h_1(\bar{p}(t))*(1-h_2(\bar{q}(t)))$$

where $h_1$ and $h_2$ are sigmoid functions as per Equation (4):

$$h(x) = \frac{1}{1 + e^{Ax+B}}$$

where x is the output obtained context confidence (e.g., $\bar{p}(t)$ or $\bar{q}(t)$, and A and B are two parameters.

The output of the context detector 116 is the steering signal 126, which is used as a weighting factor for subsequent processing by the confidence decider 118. The range of the steering signal 126 is a soft value from 0.0 to 1.0, where the value 0 indicates a non-music context while the value 1.0 indicates a music context. Between 0 and 1, the larger the value is, the more likely the audio signal 102 is in music context.

Confidence Decider 118

The confidence decider 118 (see FIG. 1) generates the final music confidence score 128 by jointly considering the steering signal 126, the set of confidence scores 122 and the confidence score 124. To achieve a smooth transition between rap music classification on/off, a mixing procedure will be taken if w(t)∈ (0,1). That is, the final output will be a mixed confidence score of the old music classifier (e.g., only the confidence score 122) and the new music classifier (e.g., a combination of both the confidence scores 122 and 124). Given the confidence score of new music classifier $x_{new}(t)$, the confidence score of old music classifier $x_{old}(t)$ [e.g., the confidence score 122], and the steering signal s(t) [e.g., the steering signal 126] discussed above, $x_{new}(t)$ can be calculated according to Equation (5):

$$x_{new}(t)=x_{old}(t)+(1-x_{old}(t))*\text{new\_conf}(t)$$

where new_conf(t) is the second-stage (rap) music confidence output (e.g., the confidence score 124).

Then the final output confidence score y(t) [e.g., the final confidence score 128] can be represented according to Equations (6) and (7):

$$y(t) = w(t)x_{new}(t) + (1 - w(t))x_{old}(t)$$

$$w(t) = \begin{cases} s(t) + (1 - s(t))*\text{new\_conf}(t) & \text{new\_conf}(t) \geq \text{Threshold}) \\ s(t) & \text{otherwise} \end{cases}$$

The threshold may be determined via a summary of statistics of the training data; according to an embodiment, a threshold of 0.9 works well.

Extensions for Additional New Classifiers

In this disclosure, the rap classifier is detailed as an example use case of building a two-stage music classifier, which not only keeps the original behavior on the existing audio content, such as speech, non-rap music, sound effect and noise, but also improves the overall listening experience of rap music by greatly improving the classification accuracy on rap songs. It is noted that, the proposed method could be easily extended or directly applied to audio systems for various use cases of music content classification, such as building a new classifier for a capella music, certain background music in game and reverbed speech in podcast. More broadly, the proposed method could be also extended to general audio systems for general content classification. The following paragraphs discuss show several specific use cases, scenarios, and applications where an old content identifier needs to be extended by a new one.

One example use case is reverb detection. For example, there is a need to specifically process the reverberation speech and then encode to bit stream such as podcast or user-generated audio content. While supporting new types of data, the new detector may need to generate similar results on the old types of data to keep backward compatibility. In this case, a reverb speech classifier may be added to the classifiers 114 (see FIG. 1).

Another example use case is gunshot detection. In a gaming application, the sound effect detector may be updated with additional types of sound effects, for example gunshot sounds. In this case, a gunshot classifier may be added to the classifiers 114.

Another example use case is noise detection. With the increasing needs from customer, the audio processing system may need to provide more functionalities (e.g., noise compensation for mobile devices), which further requires the noise classifier identify more audio content types (e.g., stationary noise in mobile). While the new noise classifier provides more classification results, it is hoped that the classification results on originally supported content types (such as noise or sound effects) could be still similar to those from the old classifier so that other audio processing algorithms, such as noise suppression and volume leveler, do not need to be heavily tuned after the new classifier is used. In this case, a new noise classifier may be added to the classifiers 114.

In summary, when a new classifier needs to be built or improved, the proposed method could be generalized from the following four considerations.

The first consideration is the relationship of old and new use case. This consideration makes clear the relationship of old and new classifiers, which decides the structure of the model combination. When the new use case is a type subset of old use case, the new classifier may be combined with old classifier as a cascaded multi-staged structure. If the new use case is an independent requirement, the new classifier may be in parallel with the old classifier. Moreover, this consideration helps to decide when the new classifier is triggered or activated and how the outcome of new classifier is combined with the confidence scores of old classifiers in the original system.

The second consideration is the new characteristics of new use case. This consideration aims to find the typical features, representing the essential characteristics of new pattern, which is used to discriminate the targeted type from other content type.

The third consideration in the training model of new use case. This consideration prepares for the training data and labelling data as the target audio type according to the new requirements, then extracts the features and trains the model of new classifier by corresponding machine learning techniques in an offline manner The fourth consideration is the integration of the new classifier. This consideration aims to integrate the new features and classifiers into the original system and tune the appropriate parameters to minimize the behavior differences of old use cases.

In order to differentiate audio content and apply the best parameters or the best audio processing algorithms correspondingly, different use case profiles may be needed and pre-designed, and system developers may choose a profile for the application context being deployed. A profile usually encodes a set of audio processing algorithms and/or their best parameters that will be applied, such as a 'File-based' profile and a 'Portable' profile which is specifically designed for high performance application or resource-limited use case, e.g. mobile. A major difference between file-based profile and portable profile is on the computational complexity by feature selection and model selection, which extended functionalities are enabled in file-based profile and disabled in portable profile.

Avoiding Impact on Established Use Cases

When we extend the original system with new request, the new system should not have huge impact on the existing application use case. This suggests the following three recommendations.

The first recommendation concerns the feature/model selection of the old use case. The general goal is to keep the original features and classifiers unchanged if possible and add or train the separated classifier for new request, which is the essential guarantee for avoiding the big impact on the existing use case.

The second recommendation concerns the determination to use the new classifier. In order to reduce the unnecessary false alarm, the determination condition to use the new classifier should be fine-tuned, which indicates that for the old use case the original classifier is used to calculate the confidence score and output the outcome and only for the new use will the new classifier be used for identifying the audio content type.

The third recommendation concerns the confidence decider between old and new classifiers. Different smoothing schemes may be used for the determination of final output between the old confidence score and the new outcome. For example, confidence score can be further smoothed in order to avoid abrupt changes and to make more smooth estimation of the parameters in audio processing algorithms. A common smoothing method is based on weighted average, for example according to Equations (8) and (9):

$$\text{Conf}(t) = \alpha \cdot \text{old\_Conf}(t) + (1-\alpha) \cdot \text{new\_conf}(t)$$

$$\text{smoothConf}(t) = \beta \cdot \text{smoothConf}(t-1) + (1-\beta) \cdot \text{conf}(t)$$

where t is a timestamp, $\alpha$, $\beta$ is the weight, conf and smoothConf is the confidence before and after smoothing, respectively.

The smoothing algorithm can be also 'asymmetric', by using different smoothing weight for different cases. For example, suppose we care more about the original output when old confidence score increases, we can design the smoothing algorithm according to Equation (10):

$$smoothConf(t) = \begin{cases} \text{old\_conf}(t) & \text{old\_conf}(t) \geq smoothConf(t-1) \\ \beta \cdot smoothConf(t-1) + (1-\beta) \cdot conf(t) & \text{otherwise} \end{cases}$$

The above formula allows the smoothed confidence score to quickly responds to the current state when the old confidence score increases, and to slowly smooth away when the old confidence score decreases. Variants of the smoothing functions may be made in similar ways.

Figure 3:
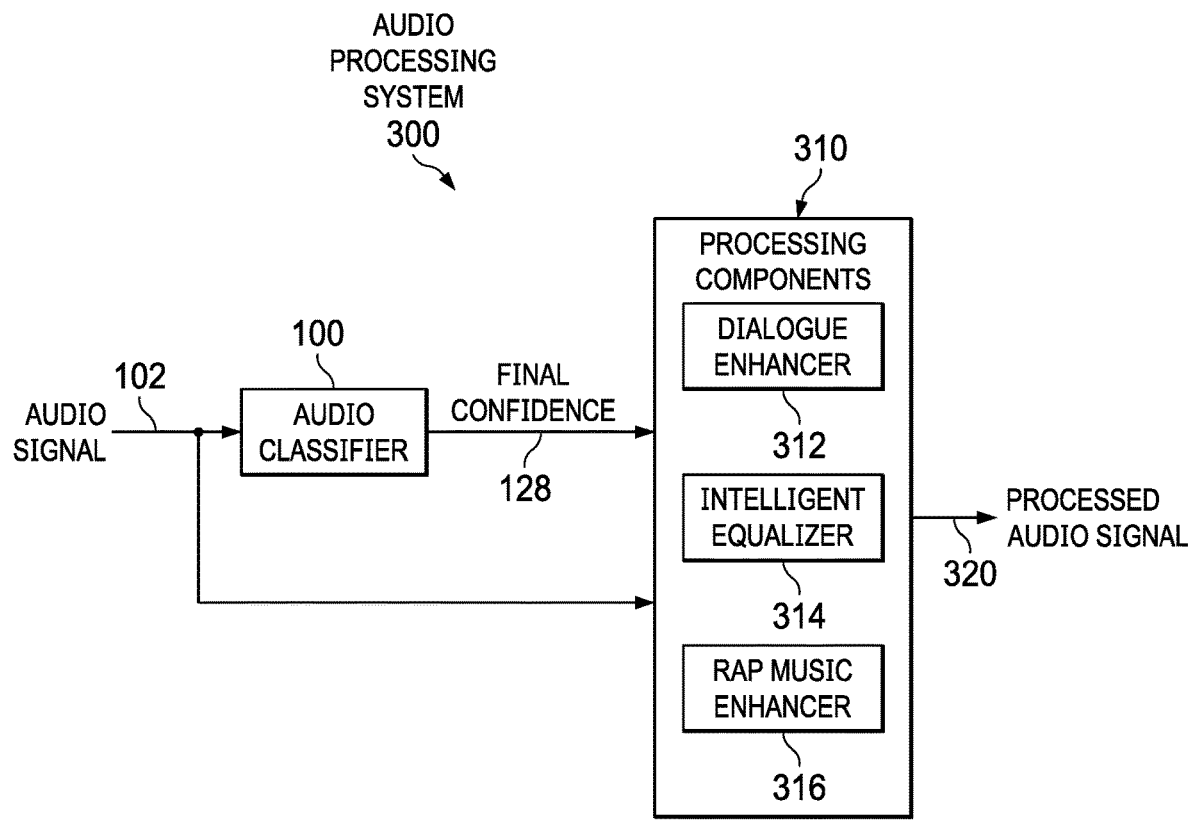
FIG. 3 is a block diagram of an audio processing system 300.

FIG. 3 is a block diagram of an audio processing system 300. The audio processing system 300 includes the audio classifier 100 (see FIG. 1) and processing components 310, including a dialogue enhancer 312, an intelligent equalizer 314, and a rap music enhancer 316.

The audio classifier 100 receives the audio signal 102 and operates as discussed above to generate the final confidence score 128. The processing components 310 receive the final confidence score and process the audio signal 102 using the appropriate components based on the final confidence score 128. For example, when the final confidence score 128 indicates the audio signal 102 is dialogue, the dialogue enhancer 312 may be used to process the audio signal 102. When the final confidence score 128 indicates the audio signal 102 has an unbalanced spectral balance, the intelligent equalizer 314 may be used to process the audio signal 102. When the final confidence score 128 indicates the audio signal 102 is rap music, the rap music enhancer 316 may be used to process the audio signal 102. The processing components 310 generate the processed audio signal 320 corresponding to the audio signal 102 having been processed by the selected components.

Figure 4:
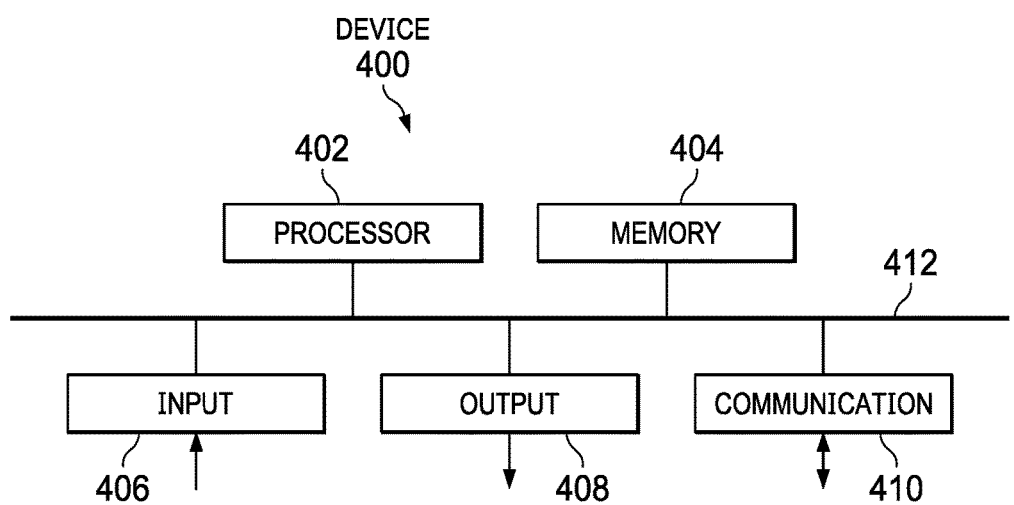
FIG. 4 is a block diagram of a device 400 that may be used to implement the audio classifier 100 (see FIG. 1), etc.

FIG. 4 is a block diagram of a device 400 that may be used to implement the audio classifier 100 (see FIG. 1), the two-stage classifier 200 (see FIG. 2), the audio processing system 300 (see FIG. 3), etc. The device 400 may be a computer (a desktop computer, a laptop computer, etc.), a gaming console, a portable device (e.g., a mobile telephone, a media player, etc.), etc. The device 400 includes a processor 402, a memory 404, one or more input components 406, one or more output components 408, and one or more communication components 410, connected by a bus 412.

The processor 402 generally controls the operation of the device 400, for example according to the execution of one or more computer programs. The processor 402 may implement one or more of the functions described herein, such as those of the features extractor 110 (see FIG. 1), the classifiers 112 and 114, the context detector 116, the confidence decider 118, the audio processing components 310 (see FIG. 3), the equations (1) through (10), the method 500 (see FIG. 5), etc. The processor 402 may interact with the memory 404 to store data, computer programs, etc.

The memory 404 generally stores data operated on by the device 400. For example, the memory 404 may store the input signal 102 (see FIG. 1; e.g., as data frames of a streaming signal, as a stored data file, etc.), the extracted features 120, the models used by the classifiers 112 and 114, the confidence scores 122 and 124, the steering signal 126, the final confidence score 128, the results of Equation (1) through Equation (10), etc. The memory 404 may also store the computer programs executed by the processor 402.

The input components 406 generally enable input into the device 400. The specifics of the input components 406 may vary based on the particular form factor of the device 400. For example, the input components 406 of a mobile telephone may include a touchscreen, a microphone, motion sensors, a camera, control buttons, etc. The input components 406 of a gaming console may include control buttons, kinetic motion sensors, a microphone, gaming controllers, etc.

The output components 408 generally enable output from the device 400. The specifics of the output components 408 may vary based on the particular form factor of the device 400. For example, the output components 408 of a mobile telephone may include a screen, a speaker, haptic mechanisms, light emitting diodes, etc. The output components 408 of a gaming console may include a screen, a speaker, etc.

The communication components 410 generally enable wired or wireless communication between the device 400 and other devices. As such, the communication components 410 include additional input and output components similar to the input components 406 and the output components 408. Wireless components include radios, such as cellular radios, IEEE 802.15.1 radios (e.g., Bluetooth™ radios), IEEE 802.11 radios (e.g., Wi-Fi™ radios), etc. Wired components include keyboards, mice, gaming controllers, sensors, etc. The specifics of the input components 406 and the output components 408 may vary based on the particular form factor of the device 400. For example, a mobile telephone may include a cellular radio to receive the input signal 102 as a streaming signal, and an IEEE 802.15.1 radio to transmit the processed audio signal 320 to a pair of wireless earbuds for output as sound.

Figure 5:
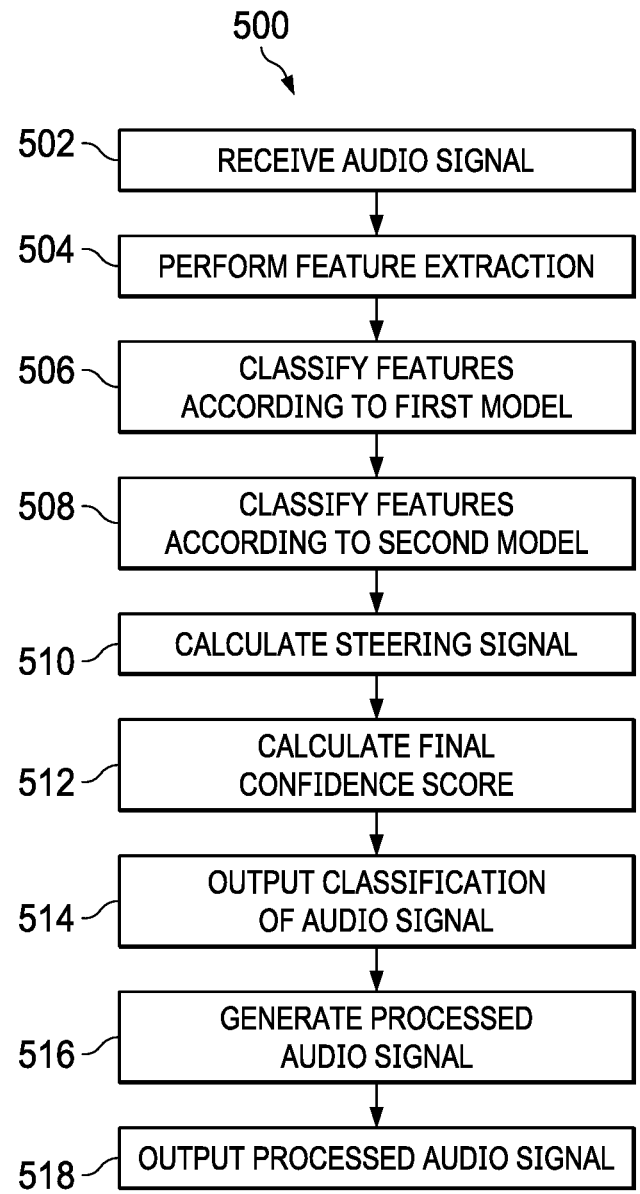
FIG. 5 is a flow diagram of a method 500 of audio processing.

FIG. 5 is a flow diagram of a method 500 of audio processing. The method 500 may be implemented by a device (e.g., the device 400 of FIG. 4), as controlled by the execution of one or more computer programs.

At 502, an audio signal is received. For example, the audio signal 102 (see FIG. 1) may be received by the communication components 410 (see FIG. 4) of the device 400. As another example, the audio signal 102 may be received from the memory 404, having been stored there previously.

At 504, feature extraction is performed on the audio signal to extract a plurality of features. For example, the feature extractor 110 (see FIG. 1) may perform feature extraction on the audio signal 102, to generate the extracted features 120. The specifics of the feature extraction performed, and the resulting extracted features, may vary based on the relevance of those particular features to the models used for classification. For example, the sub-band energies of the input signal 102 may be relevant to the rap classification model.

At 506, the plurality of features is classified according to a first audio classification model to generate a first set of confidence scores. For example, the classifiers 112 (see FIG. 1) may classify the extracted features 120 according to a music classification model, a speech classification model, a noise classification model, a sound effect classification model, etc., generating respective confidence scores 122.

At 508, the plurality of features is classified according to a second audio classification model to generate a second confidence score. For example, the classifiers 114 (see FIG. 1) may classify the extracted features 120 according to a rap classification model to generate a rap confidence score 124.

At 510, a steering signal is calculated by combining a first component of the first set of confidence scores smoothed over a first time period and a second component of the first set of confidence scores smoothed over a second time period, where the second time period is shorter than the first time period. For example, the context detector 116 (see FIG. 1) may generate the steering signal 126 according to Equation (3), using long-term context information according to Equation (1) and short-term context information according to Equation (2).

At 512, a final confidence score is calculated according to the steering signal, the first set of confidence scores, and the second confidence score. For example, the confidence decider 118 (see FIG. 1) may generate the final confidence score 128 according to the steering signal 126, the confidence scores 122 and the confidence scores 124. The final confidence score may correspond to a weighted combination of the confidence scores 122 and 124, e.g., computed according to Equation (6).

At 514, a classification of the audio signal is output according to the final confidence score. For example, the confidence decider 118 (see FIG. 1) may output the final confidence score 128 for use by other components of the device 400.

At 516, one of a first process and a second process selectively performing on the audio signal, based on the classification, to generate a processed audio signal, where the first process is performed when the classification is a first classification and the second process is performed when the classification is a second classification. For example, when the audio signal 102 (see FIG. 1) corresponds to speech, the dialogue enhancer 312 (see FIG. 3) may be used to generate the processed audio signal 320. When the audio signal 102 corresponds to rap, the rap music enhancer 316 may be used to generate the processed audio signal 320.

At 518, the processed audio signal is output as sound. For example, a speaker of the device 400 may output the processed audio signal 320 as audible sound.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

Various aspects of the present invention may be appreciated from the following enumerated example embodiments (EEEs):

EEE1. A method of audio processing, the method comprising:
receiving an audio signal;
performing feature extraction on the audio signal to extract a plurality of features;
classifying the plurality of features according to a first audio classification model to generate a first confidence score;
classifying the plurality of features according to a second audio classification model to generate a second confidence score;
calculating a steering signal by combining a first component of the first confidence score and a second component of the first confidence score;
calculating a final confidence score according to the steering signal, the first confidence score, and the second confidence score; and outputting a classification of the audio signal according to the final confidence score.

EEE2. The method of EEE 1, wherein a plurality of models includes a first set of models and the second audio classification model, wherein the first set of models includes the first audio classification model, wherein classifying the plurality of features according to the first audio classification model to generate the first confidence score comprises:
classifying the plurality of features according to the first set of models to generate the first confidence score.

EEE3. The method of EEE 2, wherein the first set of models includes a speech classification model and a music classification model.

EEE4. The method of any of EEEs 1-3, wherein the second audio classification model is a rap classification model.

EEE5. The method of any of EEEs 1-4, wherein performing feature extraction includes determining a plurality of sub-band energies for a plurality of sub-bands of the audio signal.

EEE6. The method of EEE 5, wherein the plurality of sub-bands includes a first sub-band below 300 Hz, a second sub-band between 300 Hz and 1000 Hz, a third sub-band between 1 kHz and 3 kHz, and a fourth sub-band between 3 kHz and 6 kHz.

EEE7. The method of any of EEEs 1-6, wherein classifying the plurality of features according to the first audio classification model includes:
classifying the plurality of features according to the first audio classification model using at least one of an adaptive boosting machine learning process and a deep neural network machine learning process.

EEE8. The method of any of EEEs 1-7, wherein calculating the steering signal comprises:
calculating the steering signal by combining the first component of the first confidence score smoothed over a first time period and the second component of the first confidence score smoothed over a second time period, wherein the second time period is shorter than the first time period.

EEE9. The method of EEE 8, wherein the first time period is at least twice the second time period.

EEE10. The method of EEE 8, wherein the first time period is between 8 and 12 seconds, and wherein the second time period is between 4 and 6 seconds.

EEE11. The method of any of EEEs 8-10, wherein the first component of the first confidence score smoothed over the first time period is calculated based on a first smoothing coefficient, a current music confidence score of a current frame of the audio signal, and a previous smoothed music confidence score of a previous frame of the audio signal; and
wherein the second component of the first confidence score smoothed over the second time period is calculated based on a second smoothing coefficient, a current sound effect and noise confidence score of the current frame of the audio signal, and a previous smoothed sound effect and noise confidence score of the previous frame of the audio signal.

EEE12. The method of any of EEEs 1-11, wherein calculating the steering signal includes:
applying a first sigmoid function to the first component of the first confidence score smoothed over the first time period; and
applying a second sigmoid function to the second component of the first confidence score smoothed over the second time period.

EEE13. The method of any of EEEs 1-12, wherein the final confidence score is calculated based on a combination of a new confidence component and an old confidence component,
wherein the new confidence component is calculated based on a combination of a first weight applied to a combination of the first confidence score and the second confidence score.

EEE14. The method of EEE 13, wherein the old confidence component is calculated based on a second weight applied to the first confidence score.

EEE15. The method of EEE 14, wherein a sum of the first weight and the second weight is one.

EEE16. The method of EEE 13, wherein the first weight selectively corresponds to one of the steering signal and a combination of the steering signal and the second confidence score, and
wherein the first weight corresponds to the steering signal when the second confidence score is less than a threshold.

EEE17. The method of any of EEEs 1-16, further comprising:
selectively performing one of a first process and a second process on the audio signal, based on the classification, to generate a processed audio signal, wherein the first process is performed when the classification is a first classification and the second process is performed when the classification is a second classification.

EEE18. A non-transitory computer readable medium storing a computer program that, when executed by a processor, controls an apparatus to execute processing including the method of any one of EEEs 1-17.

EEE19. An apparatus for audio processing, the apparatus comprising:
a processor; and
a memory,
wherein the processor is configured to control the apparatus to receive an audio signal,
wherein the processor is configured to control the apparatus to perform feature extraction on the audio signal to extract a plurality of features,
wherein the processor is configured to control the apparatus to classify the plurality of features according to a first audio classification model to generate a first confidence score,
wherein the processor is configured to control the apparatus to classify the plurality of features according to a second audio classification model to generate a second confidence score,
wherein the processor is configured to control the apparatus to calculate a steering signal by combining a first component of the first confidence score smoothed over a first time period and a second component of the first confidence score smoothed over a second time period, wherein the second time period is shorter than the first time period,
wherein the processor is configured to control the apparatus to calculate a final confidence score according to the steering signal, the first confidence score, and the second confidence score, and
wherein the processor is configured to control the apparatus to output a classification of the audio signal according to the final confidence score.

EEE20. The apparatus of EEE 19, wherein the second audio classification model is a rap classification model,
wherein performing feature extraction includes determining a plurality of sub-band energies for a plurality of sub-bands of the audio signal, and
wherein the plurality of sub-bands includes a first sub-band below 300 Hz, a second sub-band between 300 Hz and 1000 Hz, a third sub-band between 1 kHz and 3 kHz, and a fourth sub-band between 3 kHz and 6 kHz.

REFERENCES

U.S. Pat. No. 10,129,314.
U.S. Application Pub. No. 2018/0181880.
U.S. Pat. No. 10,411,669.
U.S. Application Pub. No. 2020/0134083.
U.S. Application Pub. No. 2011/0029108.
U.S. Pat. No. 10,522,186.
U.S. Pat. No. 8,400,566.
U.S. Pat. No. 7,263,485.
U.S. Pat. No. 7,953,693.
U.S. Pat. No. 10,424,321.
U.S. Pat. No. 10,556,087.
U.S. Application Pub. No. 2020/0075019.
U.S. Pat. No. 9,020,816.
China Application Publication CN103186527A.
China Application Publication CN111177454A.
Ja-Hwung Su, Hsin-Ho Yeh, Philip S. Yu and Vincent S. Tseng, "Music Recommendation Using Content and Context Information Mining", in IEEE Intelligent Systems, vol. 25, no. 1, pp. 16-26, Jan.-Feb. 2010, doi: 10.1109/MIS.2010.23.
U.S. Pat. No. 9,842,605.

The invention claimed is:

1. A method of audio processing, the method comprising:
receiving an audio signal;
performing feature extraction on the audio signal to extract a plurality of features;
classifying the plurality of features according to a first audio classification model to generate a first set of confidence scores;
classifying the plurality of features according to a second audio classification model to generate a second confidence score;
calculating a steering signal by combining a first confidence score of the first set of confidence scores and a further confidence score of the first set of confidence scores;
calculating a final confidence score according to the steering signal, the first set of confidence scores, and the second confidence score; and
outputting a classification of the audio signal according to the final confidence score.

2. The method of claim 1, wherein a plurality of models includes a first set of models and the second audio classification model, wherein the first set of models includes the first audio classification model, wherein classifying the plurality of features according to the first audio classification model to generate the first set of confidence scores comprises:
classifying the plurality of features according to the first set of models to generate the first set of confidence scores.

3. The method of claim 2, wherein the first set of models includes a speech classification model and a music classification model.

4. The method of claim 1, wherein the second audio classification model is a rap classification model.

5. The method of claim 1, wherein performing feature extraction includes determining a plurality of sub-band energies for a plurality of sub-bands of the audio signal.

6. The method of claim 5, wherein the plurality of sub-bands includes a first sub-band below 300 Hz, a second sub-band between 300 Hz and 1000 Hz, a third sub-band between 1 kHz and 3 kHz, and a fourth sub-band between 3 kHz and 6 kHz.

7. The method of claim 1, wherein classifying the plurality of features according to the first audio classification model includes:
classifying the plurality of features according to the first audio classification model using at least one of an adaptive boosting machine learning process and a deep neural network machine learning process.

8. The method of claim 1, wherein calculating the steering signal comprises:
calculating the steering signal by combining the first confidence score of the first set of confidence scores smoothed over a first time period and the further confidence score of the first set of confidence scores smoothed over a second time period, wherein the second time period is shorter than the first time period.

9. The method of claim 8, wherein the first time period is at least twice the second time period.

10. The method of claim 8, wherein the first confidence score of the first set of confidence scores smoothed over the first time period is calculated based on a first smoothing coefficient, a current music confidence score of a current frame of the audio signal, and a previous smoothed music confidence score of a previous frame of the audio signal; and
wherein the further confidence score of the first set of confidence scores smoothed over the second time period is calculated based on a second smoothing coefficient, a current sound effect and noise confidence score of the current frame of the audio signal, and a previous smoothed sound effect and noise confidence score of the previous frame of the audio signal.

11. The method of claim 1, wherein calculating the steering signal includes:
applying a first sigmoid function to the first confidence score of the first set of confidence scores smoothed over the first time period; and
applying a second sigmoid function to the further confidence score of the first set of confidence scores smoothed over the second time period.

12. The method of claim 1, further comprising:
selectively performing one of a first process and a second process on the audio signal, based on the classification, to generate a processed audio signal, wherein the first process is performed when the classification is a first classification and the second process is performed when the classification is a second classification.

13. The method of claim 1, wherein the final confidence score is calculated based on a combination of a new confidence component and an old confidence component,
wherein the new confidence component is calculated based on a combination of a first weight applied to a combination of the first confidence score and the further confidence score.

14. The method of claim 13, wherein the old confidence component is calculated based on a second weight applied to the first confidence score.

15. The method of claim 14, wherein a sum of the first weight and the second weight is one.

16. The method of claim 13, wherein the first weight selectively corresponds to one of the steering signal and a combination of the steering signal and the further confidence score, and
wherein the first weight corresponds to the steering signal when the further confidence score is less than a threshold.

17. A non-transitory computer readable medium storing a computer program that, when executed by a processor, controls an apparatus to execute processing including the method of claim 1.

18. An apparatus for audio processing, the apparatus comprising:
a processor; and
a memory,
wherein the processor is configured to control the apparatus to receive an audio signal,
wherein the processor is configured to control the apparatus to perform feature extraction on the audio signal to extract a plurality of features,
wherein the processor is configured to control the apparatus to classify the plurality of features according to a first audio classification model to generate a first set of confidence scores,
wherein the processor is configured to control the apparatus to classify the plurality of features according to a second audio classification model to generate a second confidence score,
wherein the processor is configured to control the apparatus to calculate a steering signal by combining a first confidence score of the first set of confidence scores and a further confidence score of the first set of confidence scores,
wherein the processor is configured to control the apparatus to calculate a final confidence score according to the steering signal, the first set of confidence scores, and the second confidence score, and
wherein the processor is configured to control the apparatus to output a classification of the audio signal according to the final confidence score.

19. The apparatus of claim 18, wherein the second audio classification model is a rap classification model,
wherein performing feature extraction includes determining a plurality of sub-band energies for a plurality of sub-bands of the audio signal, and
wherein the plurality of sub-bands includes a first sub-band below 300 Hz, a second sub-band between 300 Hz and 1000 Hz, a third sub-band between 1 kHz and 3 kHz, and a fourth sub-band between 3 kHz and 6 kHz.

20. The apparatus of claim 18, wherein calculating the steering signal comprises:
calculating the steering signal by combining the first confidence score of the first set of confidence scores smoothed over a first time period and the further confidence score of the first set of confidence scores smoothed over a second time period, wherein the second time period is shorter than the first time period.

* * * * *